US012536855B1

(12) United States Patent
Bansod et al.

(10) Patent No.: US 12,536,855 B1
(45) Date of Patent: Jan. 27, 2026

(54) SYSTEM AND METHOD FOR DISTRIBUTED POPULATION STRATIFICATION

(71) Applicant: Luma Health, Inc., San Mateo, CA (US)

(72) Inventors: Aditya Bansod, San Francisco, CA (US); Marcelo Oliveira, San Francisco, CA (US); David Beam, Phoenix, AZ (US)

(73) Assignee: Luma Health, Inc., San Mateo, CA (US)

( * ) Notice: Subject to any disclaimer, the term of this patent is extended or adjusted under 35 U.S.C. 154(b) by 0 days.

(21) Appl. No.: 17/563,930

(22) Filed: Dec. 28, 2021

Related U.S. Application Data

(60) Provisional application No. 63/131,283, filed on Dec. 28, 2020.

(51) Int. Cl.
*G07C 9/22* (2020.01)
*G16H 10/60* (2018.01)
*G16H 50/30* (2018.01)

(52) U.S. Cl.
CPC ............... *G07C 9/22* (2020.01); *G16H 10/60* (2018.01); *G16H 50/30* (2018.01)

(58) Field of Classification Search
CPC .......... G07C 9/22; G16H 10/60; G16H 50/30
See application file for complete search history.

(56) References Cited

U.S. PATENT DOCUMENTS

| | | | | |
|---|---|---|---|---|
| 11,342,051 | B1* | 5/2022 | Jain | G16H 10/60 |
| 2017/0039339 | A1* | 2/2017 | Bitran | G16H 50/30 |
| 2020/0372743 | A1* | 11/2020 | Miller | G07C 9/257 |
| 2021/0313026 | A1* | 10/2021 | Wagner | A61B 5/1176 |
| 2021/0358068 | A1* | 11/2021 | Boszczyk | G06Q 50/265 |
| 2022/0037034 | A1* | 2/2022 | Stanescu | G16H 50/70 |
| 2022/0142491 | A1* | 5/2022 | Siwak | G16H 50/30 |

* cited by examiner

*Primary Examiner* — Rufus C Point
(74) *Attorney, Agent, or Firm* — Wilson Sonsini Goodrich & Rosati (57) ABSTRACT

The present disclosure relates to a system and method for delivering highly customized, relevant, optimized communications to selected (segmented) client nodes in a computer network.

19 Claims, 6 Drawing Sheets

SYSTEM AND METHOD FOR DISTRIBUTED POPULATION STRATIFICATION

CROSS-REFERENCE

This application claims priority to U.S. Provisional Patent Application No. 63/131,283 filed on Dec. 28, 2020, which application is incorporated herein by reference in its entirety for all purposes.

FIELD

The present disclosure relates in general to the distribution of messages by a broadcast system.

BACKGROUND

In information management platforms, a computer network may facilitate the exchange and/or delivery of data packets for communications between multiple client nodes and platforms. It is difficult for an organizer to manage and serve a large population when granting access to a building, venue, or specific aera(s) of a building or venue. Especially when there is an infectious disease spreading in society, each individual may have different travel history, risk factors, different levels of exposure to a virus, etc. Additionally, each area of a venue may serve different functions, e.g., some may serve to treat a specific type of virus, and some may be maintained virus-free. It is time-consuming and not reliable for an organizer to determine the access status of each individual. Thus, there exists a need for community leaders and/or event organizers to efficiently and reliably vet their populations for infectious diseases at a scalable rate. In order to facilitate a more efficient vetting process, a more sophisticated approach toward the generation and distribution of access codes may be required.

SUMMARY

Recognized herein is a need to deliver highly customized, relevant, optimized communications to selected (segmented) client nodes in a computer network. Systems and methods herein provide users with an online/mobile platform configured to deliver dynamically-generated communications to recipient users and track relevant user health data responses to such communications.

According to an aspect of the invention, the system may allow for more customized, efficient, and optimized communication with a large population. In general, one innovative aspect of the subject matter described in the present disclosure can be embodied in a system and method for stratifying populations by various factors, such as symptoms and risk factors for infectious diseases. By screening population members for factors using self-testing screening procedures, the present subject matter provides for a distributed approach to grouping members of a community according to risk levels and other factors. In some embodiments, these factors may correlate to members' risks of contracting an infectious disease, and members' symptoms associated with an infectious disease, among others.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings.

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

It should be noted that the figures are not necessarily drawn to scale and that elements of structures or functions are generally represented by reference numerals for illustrative purposes throughout the figures. It also should be noted that the figures are only intended to facilitate the description of the various embodiments described herein. The figures do not describe every aspect of the teachings described herein and do not limit the scope of the disclosure.

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The following disclosure provides different embodiments, or examples, for implementing different features of the subject matter. Specific examples of components and arrangements are described below to simplify the present disclosure. These are, of course, merely examples and are not intended to be limiting.

The need exists for community leaders and event organizers to efficiently and reliably vet their populations for infectious diseases at a scalable rate. In general, one innovative aspect of the subject matter described in the present disclosure can be embodied in a system and method for stratifying populations by various factors, such as symptoms and risk factors for infectious diseases. By screening population members for factors using self-testing screening procedures, the present subject matter provides for a distributed approach to grouping members of a community according to risk levels and other factors. In some embodiments, these factors may correlate to members' risks of contracting an infectious disease, members' symptoms associated with an infectious disease, among others.

Embodiments may vary according to various applications of the present subject matter. For example, community administrators may implement the present subject matter to identify at-risk members in their community in order to keep them safe. Similarly, identifying potential carriers of an infectious disease allows communities to concentrate resources on treating the members that exhibit the most symptoms. As another example, event organizers may implement the present subject matter to screen attendees before admission to their event. By prescreening attendees, an event may reduce the likelihood that an infectious disease will be transmitted. As yet another example, university and school administrators may use the present subject matter to screen students and professors before permitting them to enter campus for in-person classes. Similarly, managers of workplaces may do the same for employees before permitting them to enter the office. The organizers, leaders, or heads of various populations may be a client as referred to herein.

Figure 1:
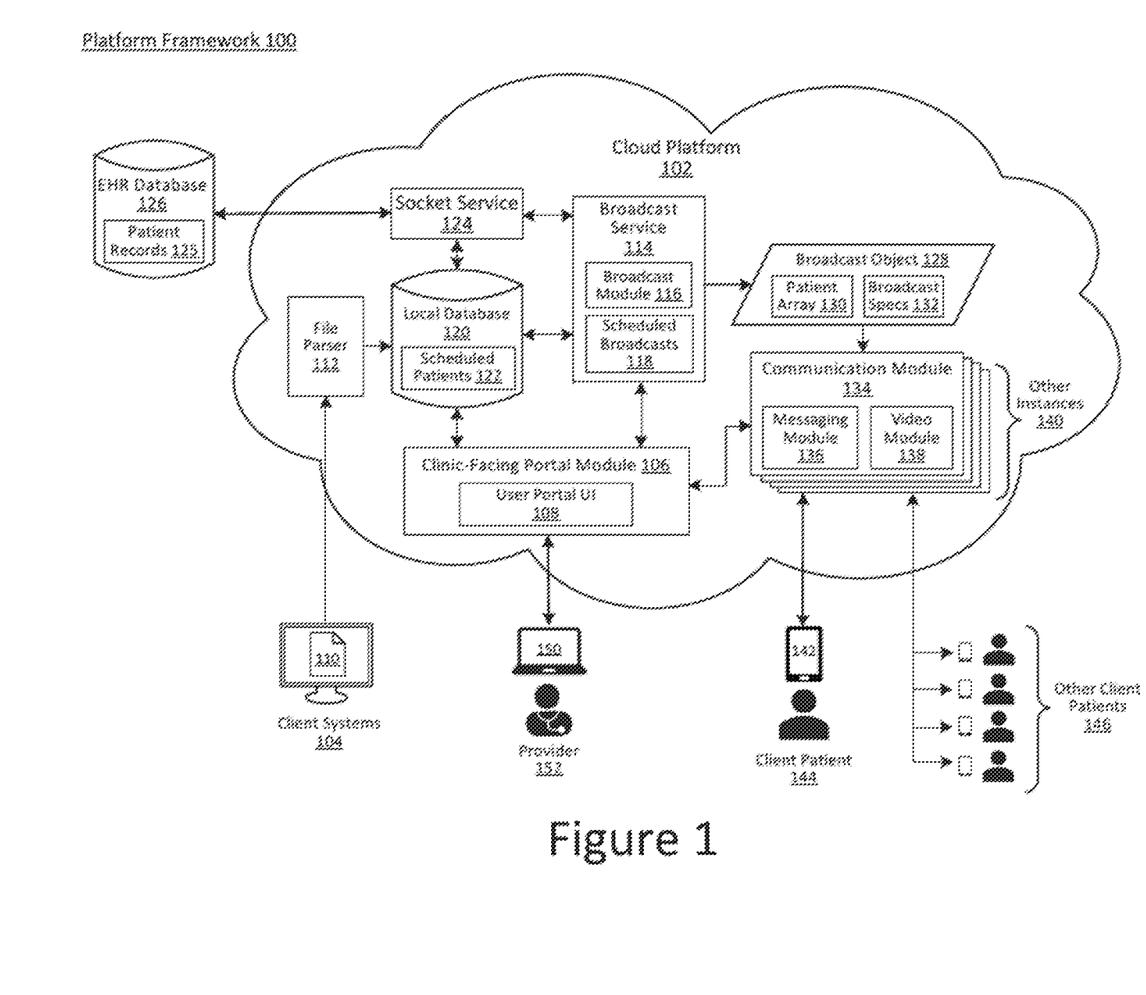
FIG. 1 illustrates an architecture for performing a high velocity distribution of messages, according to some embodiments.

FIG. 1 illustrates an architecture for performing a high velocity distribution of messages, according to some embodiments. According to some embodiments, platform framework 102 includes cloud platform 100 comprising modules for communicating with client systems 104, healthcare providers 152, provider devices 150, and client patients and their respective devices, such as client patient 144 and patient device 142, as well as other client patients 146 and their respective devices. Client systems 104 may include a database of client patient contact information 110 which may be provided to cloud platform 102 for processing.

According to some embodiments, contact information 110 may be provided by client systems 104 to file parser 112 of cloud platform 102. File parser 112 may scan contact information 110 and structure the data contained therein for storing in local database 120 as patient records. For example, file parser 112 may store output in local database 120 as scheduled patients 122. In some embodiments, local database 120 may store patient records locally as scheduled patients 122. In other embodiments, patient records may be stored remotely. For example, local database 120 may be communicatively coupled to socket service 124 for syncing between EHR database 126 to maintain updated patient records 125 in EHR database 126. Local database 120 may store at least a subset of patient records 125 as scheduled patients 122, according to some embodiments.

Cloud platform 102 further includes broadcast service 114 that contains broadcast module 116 and a set of scheduled broadcasts 118. Broadcast service 114 may maintain a record of scheduled broadcasts 118 and their respective statuses. For example, broadcast service 114 may update scheduled broadcasts 118 to reflect a new broadcast for scheduled patients 122, including parsed contact information 110 associated with patient records 125. Broadcast module 116 of broadcast service 114 may use each broadcast of scheduled broadcasts 118 to generate a broadcast object 128 that may be passed to communication module 134 for distribution.

Broadcast object 128 includes a patient array 130 and broadcast specifications 132. For example, patient array 130 may include an array of patient records or information therefrom, such as the parsed contact information 110. Broadcast specification 132 provides details regarding the message to be sent (e.g., a reason or goal of such communication), and the method by which the broadcast of such a message should be disseminated by the communication module 134. For example, broadcast specifications 132 may provide for a message containing a URL link that, when opened by a client patient, opens a web-based form which allows a user to perform a risk analysis for a particular infectious disease. In other examples, broadcast specifications 132 may indicate that the risk analysis is performed in-thread by messaging module 136 of communication module 134. In some embodiments, a risk analysis may be initiated by client patient 144 (e.g., rather than by broadcast service 114).

Communication module 134 may contain messaging module 136 and video module 138. While a single instance of communication module 134 may process a single patient (e.g., client patient 144), other instances 140 may process other client patients 146. Specifically, communication module 134 may receive a first patient record from patient array 130, the first patient record indicative of a single client patient 144 identified in patient array 130. Communication module 134 may identify contact information contained within the first patient record and initiate communication with the associated client patient 144. In some embodiments, communication may include chat messaging (e.g., messaging module 136), video calling (e.g., video module 138), or a combination thereof, among others. Messaging module 136 of communication module 134 may handle in-thread communication with client patient 144.

In some embodiments, other instances 140 of communication module 134 may receive other patient records from patient array 130 for handling communication with other client patients 146. Once the broadcast object 128 is passed into communication module 134, the associated status of broadcast object 128 may be updated in scheduled broadcasts 118. According to some embodiments, statuses of a broadcast object 128 may include upload-pending, uploaded, upload-failed, patients-in-progress, patients-completed, among others.

According to some embodiments, the risk analysis facilitated by broadcast object 128 may determine a stratification category based on determined risk-level. Once determined, the associated patient record of patient records 125 may be updated to reflect the determined risk-level accordingly. In some embodiments, risk-level may include low, medium, or high, among others. For example, client patient 144 may be determined to be a low risk patient. Upon determining a low risk-level, communication module 134 may provide client patient 144 with a code or indication of such while updating patient records 125 accordingly.

In some embodiments, if the risk analysis determines that client patient 144 is a medium or high risk-level, the communication module 134 may schedule client patient 144 for an appointment with provider 152. Video module 138 may be used to facilitate a virtual appointment over video at the time the appointment is scheduled.

Figure 2A:
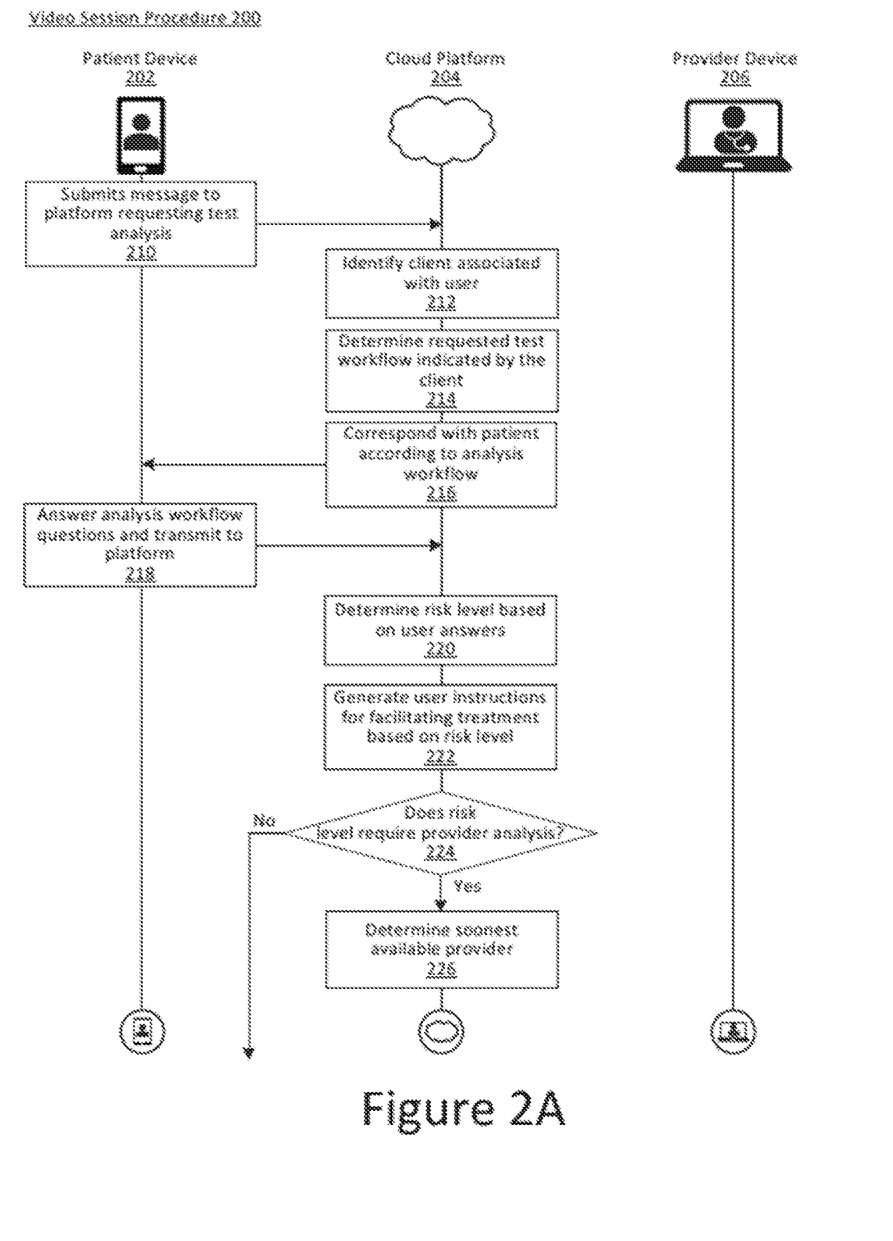
FIG. 2A illustrates a flow chart of an exemplary video session procedure, according to some embodiments.

FIG. 2A illustrates a flow chart of an exemplary video session procedure, according to some embodiments. In some embodiments, members (e.g., patients) of the client (e.g., an organization, community, etc.) may initiate the risk analysis by sending a request from their device (e.g., patient device 202) to the platform (e.g., cloud platform 204). For example, procedure 200 involves a patient device 202, cloud platform 204, and provider device 206. At 210, patient device 202 transmits a message to cloud platform 204 requesting a test analysis. The client associated with the patient of patient device 202 may have already provided the contact information used by patient device 202.

Upon receiving the message, at 212, cloud platform 204 extracts the sender's contact information therefrom. Cloud platform 204 identifies a patient record containing the extracted contact information (e.g., phone number) of patient device 202, as well as the client associated with the contact information of the patient record. In some embodiments, if cloud platform 204 cannot identify a client or particular patient record associated with the contact information of patient device 202, cloud platform 204 may transmit a response to patient device 202 stating that the user's information could not be identified. Cloud platform 204 may store the contact information and other associated data as a new patient record unassigned to a particular client for future reference, according to some embodiments. If a client provides contact information that matches the new patient record, the cloud platform may follow-up with the patient by sending a message to patient device 202 to reinitiate the risk analysis.

Procedure 200 further includes cloud platform 204 determining, at operation 214, a test or analysis workflow as requested by the client. In some embodiments, the patient record associated with the contact information of patient device 202 may indicate the requested analysis workflow. At operation 216 of procedure 200, cloud platform 204 may then correspond with patient device 202 according to the identified analysis workflow. At operation 218, the patient may provide, through patient device 202, answers to the analysis workflow questions provided by cloud platform 204.

Upon receiving answers from patient device 202, cloud platform 204 may determine, at 220, a risk level based on the received answers. According to some embodiments, procedure 200 may generate, at operation 222, user instructions for facilitating treatment based on the determined risk level. According to some embodiments, the user instructions generated at operation 222 may vary based on the risk level as determined at operation 220. For example, cloud platform 204 may determine a first patient to be low-risk, while a second patient is high-risk. As such, cloud platform 204 may generate user instructions for the first patient according to procedures for low-risk patients. In some embodiments, low-risk patients may be granted privileged access to areas or buildings associated with the client. Therefore, the first patient identified as low-risk may receive user instructions containing an access code (e.g., ASCII-based text, QR code, or other code) for displaying on the graphical user interface of the first patient's device (e.g., patient device 142).

On the other hand, cloud platform 204 may generate different user instructions for the second patient identified as high-risk according to procedures for high-risk patients. In some embodiments, high-risk patients may be required or otherwise asked to meet with a healthcare provider for confirming or otherwise validating diagnosis. Therefore, the second patient identified as high-risk may receive user instructions to schedule an appointment with a healthcare provider. In some embodiments, cloud platform 204 may schedule the appointment with a healthcare provider on behalf of the patient. For example, at 224, procedure 200 determines whether the risk level requires a healthcare provider's analysis (e.g., medium risk level, high risk level). If the risk analysis does require a healthcare provider's analysis, cloud platform 204 determines the next available healthcare provider (e.g., provider 152) at 226.

Figure 2B:
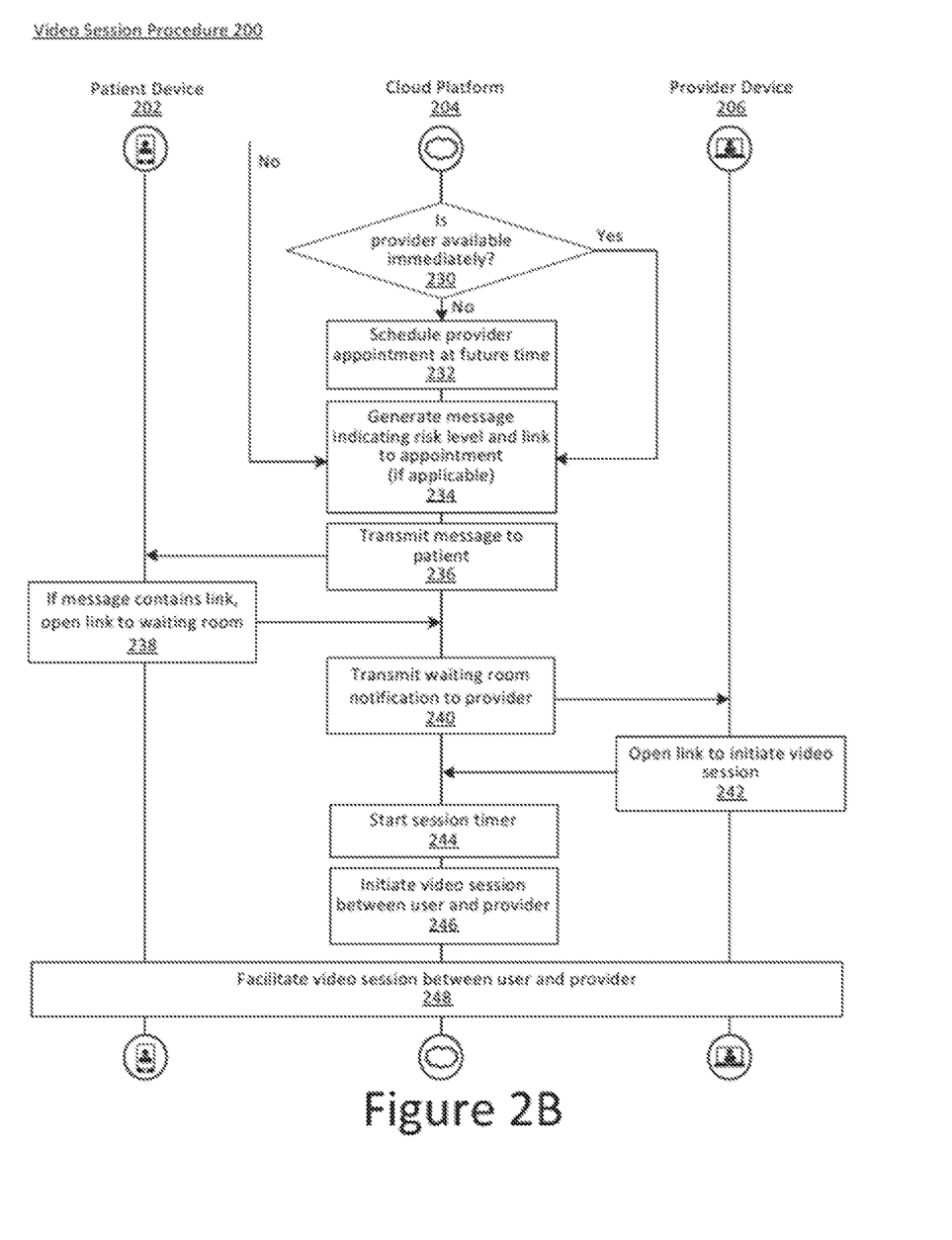
FIG. 2B illustrates a continuation of the flow chart of an exemplary video session procedure, according to some embodiments.

FIG. 2B illustrates a flow chart of an exemplary message distribution procedure, according to some embodiments. FIG. 2B may be understood as a continuation of procedure 200 following step 226. If the provider is not available immediately, then procedure 200 further includes scheduling, at 232, an appointment with the healthcare provider at a future time. In procedure 200, cloud platform 204 generates, at 234, a message indicating the risk level and other data associated with the risk analysis. In some embodiments, the message may include a link to the immediate appointment or attachment for the future scheduled appointment. The message may also include a link or attachment (e.g., text, URL, QR code, graphic, among others) that allows the patient to indicate their risk-level status to others. Procedure 200 then includes cloud platform 204 transmitting, at 236, the generated message to patient device 202.

In some embodiments, the message may directly contain information provided by the link (e.g., risk analysis results, appointment details, etc.). In some embodiments, once a patient device receives a message with a link, the patient may open the link provided in the message using a browser of patient device 202 at 238 of procedure 200. If the healthcare provider is available immediately, the link may open a waiting room web page, in some embodiments. Cloud platform 204 then transmits, at 240 of procedure 200, a waiting room notification to provider device 206 to inform the healthcare provider that a patient is waiting for them. In some embodiments, the waiting room notification may include a link to initiate a video session with the patient in the waiting room. After receiving the waiting room notification at provider device 206, the healthcare provider may open the link to initiate the video session at 242.

Cloud platform 204 may start a session timer at 244 of procedure 200 at or before the video session is initiated between the healthcare provider and the patient. Cloud platform 204 may then initiate a video session between the healthcare provider and the patient at 246 of procedure 200. Procedure 200 further includes, at 248, cloud platform 204 facilitating a video session between patient device 202 and provider device 206.

Figure 2C:
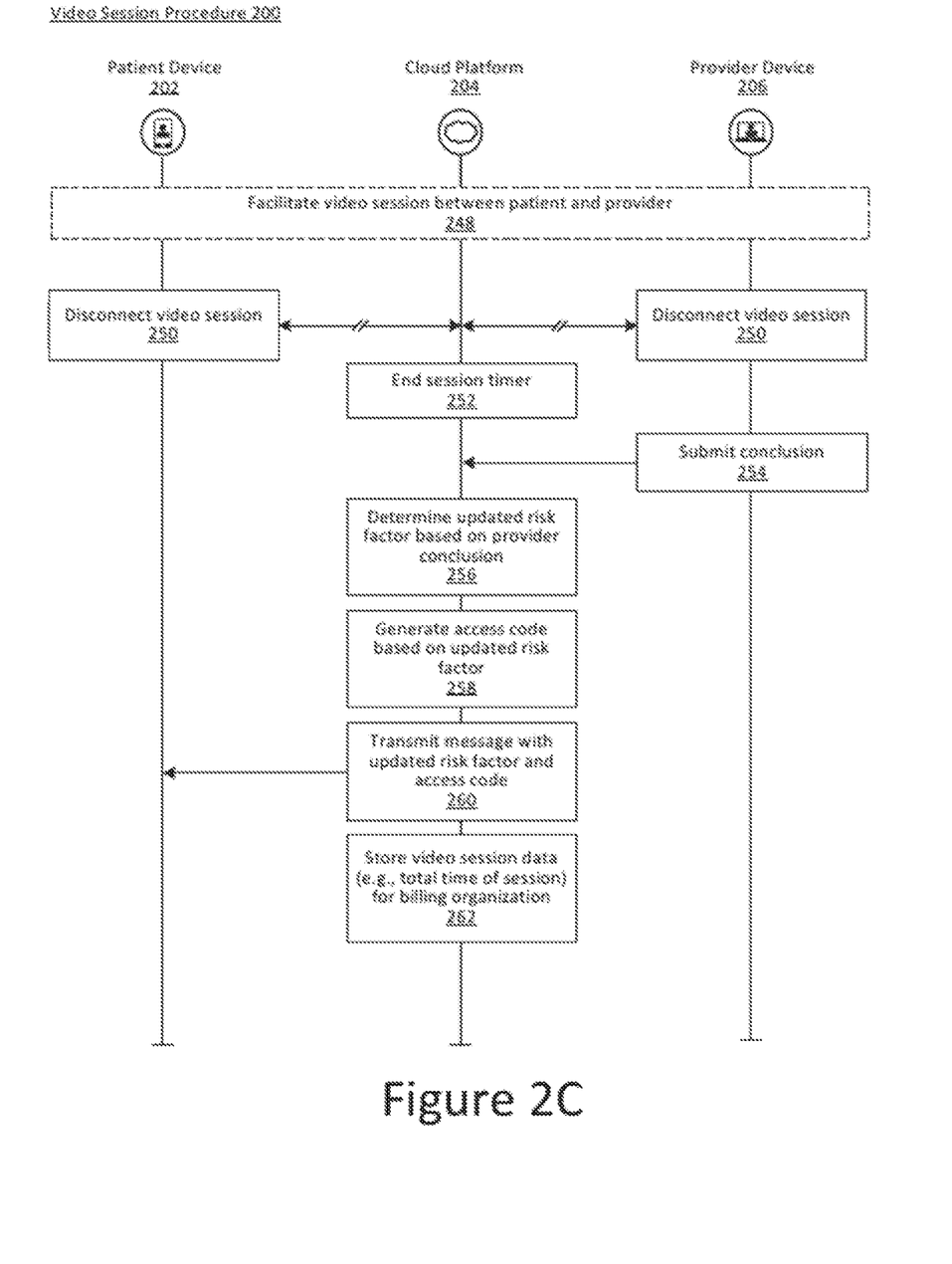
FIG. 2C illustrates a continuation of the flow chart of an exemplary video session procedure, according to some embodiments.

FIG. 2C illustrates a continuation of the flow chart of an exemplary video session procedure, according to some embodiments. FIG. 2C may be understood as a continuation of procedure 200 following step 248. Either device, including patient device 202 or provider device 206, may disconnect from the video session at 250 of procedure 200, ending the video session. Once the video session is ended, cloud platform 204 may end the session timer at 252 of procedure 200.

In some embodiments, a healthcare provider may be provided with an interface on provider device 206 to submit feedback regarding the risk-level or prognosis of the patient. Specifically, the healthcare provider may submit through provider device 206 a decisive conclusion at 254 of procedure 200. In some embodiments, the submitted conclusion at 254 may include an indicator of risk-level to associate with the patient. In other embodiments, the submitted conclusion may be interpreted by cloud platform 204 by processing the provider's conclusion using Natural Language Processing techniques and/or other classifier mapping models. Cloud platform 204 can determine, at 256 of procedure 200, a risk level based on the provider's conclusion. Procedure 200 may then include the cloud platform 204 generating an access code based on the updated risk level at 258. Cloud platform 204 may then transmit, at 260 of procedure 200, a message with the access code and other associated information related to the patient record, such as the updated risk level of the patient.

As an example, a patient may be identified as a medium risk level by the risk analysis of procedure 200 (e.g., 220). The healthcare provider, however, after a video session with the patient and identifying more nuanced symptoms, is able to determine that the patient indeed poses a high risk of having contracted the infectious disease of interest. Thus, the healthcare provider may indicate that the patient may indeed be a carrier of an infectious disease by submitting a conclusion stating as such. Upon receiving the healthcare provider's conclusion, cloud platform 204 may determine the patient's associated risk-level to be high, and may store the high risk-level in the patient's associated patient record. In some embodiments, upon storing a high risk-level for a patient based on a healthcare provider's conclusion, cloud platform may initiate a secondary procedure to ship a test kit for the particular infectious disease to confirm the prognosis. In some embodiments, a shipping a test kit may be used in place of the video session with a healthcare provider. Various procedures may be implemented depending on client agreements.

As another example, a healthcare provider may determine a patient to be a non-carrier and, therefore, may submit a conclusion indicating that the patient is not a carrier of the infectious disease. Upon receiving a non-carrier conclusion, cloud platform may generate an access code based on the updated, non-carrier risk level, according to some embodiments. In some embodiments, this access code may be generated as a QR code, bar code, text, or other formats used to represent a combination of characters. This access code may be used to indicate the patient's risk-level status or other information related to the associated patient record, according to some embodiments. In some embodiments, a patient may be able to present the access code in order to enter or be granted access to certain facilities or areas associated with the client.

For example, a university client may submit students as patients to the cloud platform. In this example, each student that receives a non-carrier risk level may receive an access code in the form of a QR code which they can present using a mobile device to access to particular buildings or other university facilities. Other students, such as those with a medium risk level, may receive an access code that indicates access to only outside facilities or otherwise grants inside access to particular buildings if the proper personal protective equipment is worn (e.g., mask, face shield, among others). Other examples may include members of a client's community accessing public areas (e.g., town halls, libraries, public parks), attendees of a client's event (e.g., festivals, concerts, rallies), or a client's business (e.g., private gyms, airlines), among others.

In some embodiments, procedure 200 may further include, at 262, storing video session data, such as total time of the video session, among other related information at cloud platform 204. In some embodiments, video session data may be used to automate billing or other administrative tasks related to healthcare providers. For example, insurance companies often request the time of a patient's appointment before providing payment for services. Thus, cloud platform 204 may generate and submit insurance claims providing the total service time provided to the patient. Other information may be stored in accordance with proper regulations, such as the Health Insurance Portability and Accountability Act (HIPPA).

Figure 3:
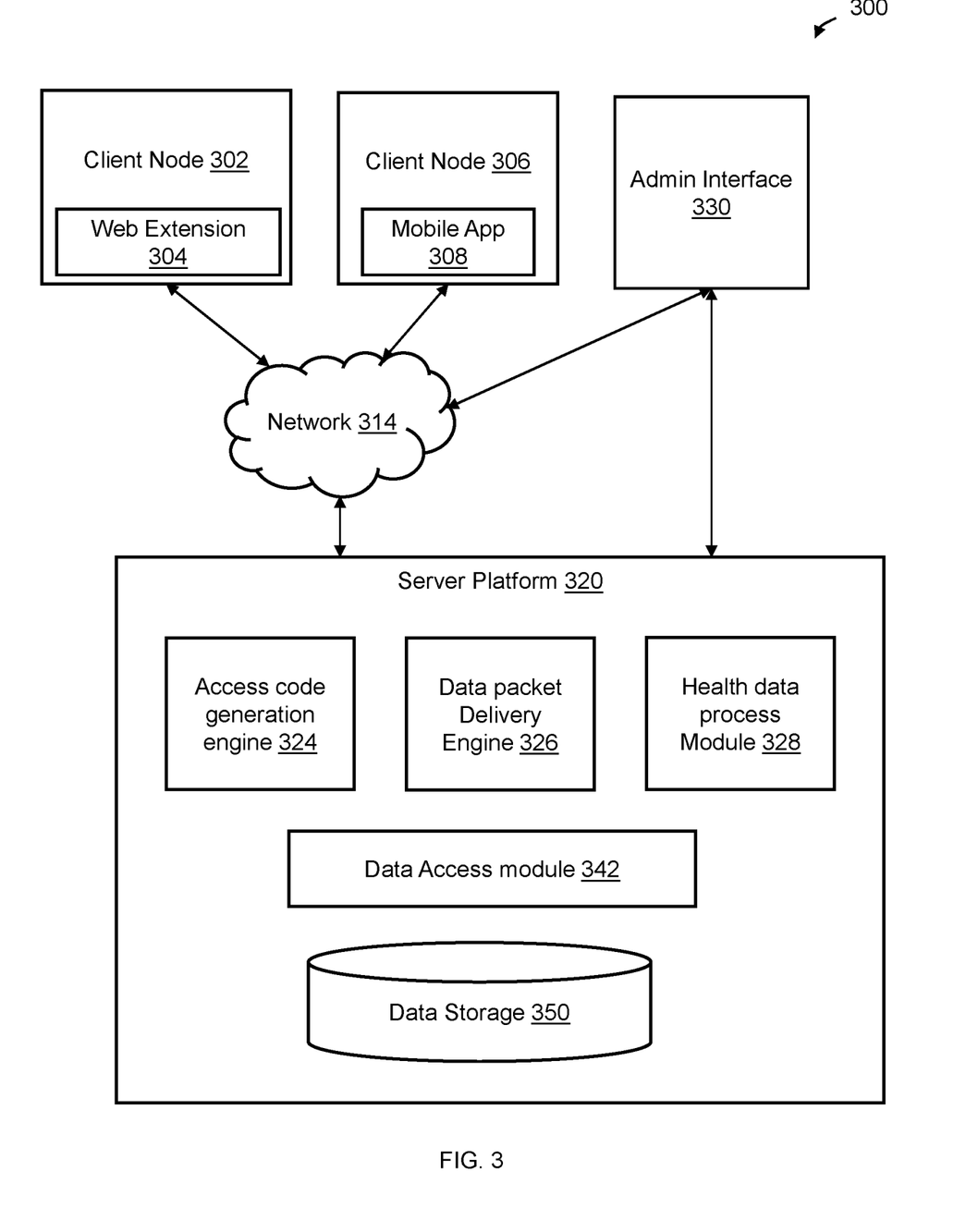
FIG. 3 is a block diagram depicting an example system 300 comprising a client-server architecture and network configured to perform the various methods described herein, according to some embodiments.

FIG. 3 is a block diagram depicting an example system 300 comprising a client-server architecture and network configured to perform the various methods described herein. A platform (e.g., machines and software, possibly interoperating via a series of network connections, protocols, application-level interfaces, and so on), in the form of a server platform 320, provides server-side functionality via a communication network 314 (e.g., the Internet or other types of wide-area networks (WANs), such as wireless networks or private networks with additional security appropriate to tasks performed by a user) to one or more client nodes 302, 306, and/or one or more administrative interfaces (e.g., admin interface 330). FIG. 3 illustrates, for example, a client node 302 hosting a web extension 304, thus allowing a user to access functions provided by the server platform 320, for example, sending or receiving a data packet from the server platform 320 requesting an access code, health evaluation guidance, etc. The web extension 304 may be compatible with any web browser application used by a user of the client node. Further, FIG. 3 illustrates, for example, another client node 306 hosting a mobile application 308, thus allowing a user to access functions provided by the server platform 320, for example, sending or receiving a data packet from the server platform 320 requesting an access code, health evaluation guidance, etc. Delivery may be through a wired or wireless mode of communication. The data packet may include, without limitation, a message in a text format, an access code (e.g., ASCII-based text, QR code, or other code), an appointment scheduling link, etc. Alternatively or additionally, the data packet may include an interactive data unit in a format that is intended to provide a user with interactive functions, such as soliciting user response or a format that is intended to elicit user activity or response. Examples of interactive data units include, without limitation, notifications, questionnaire, or survey for a user to fill out. In some embodiments, the data packet may include other information for a user to consider, such as what physical areas is a user granted access to based on his or her current access code status, etc.

A client node (e.g., client node 302 and/or client node 306) may be, for example, a user device (e.g., mobile electronic device, stationary electronic device, etc.). A client node may be associated with, and/or be accessible to, a user. In another example, a client node may be a computing device (e.g., server) accessible to, and/or associated with, an individual or entity. A node may comprise a network module (e.g., network adaptor) configured to transmit and/or receive data. Via the nodes in the computer network, multiple users and/or servers may communicate and exchange data, such as interactive data units. In some instances, the client nodes may receive and present to a user an Internet-featured item (e.g., a message in a text format, an access code (e.g., ASCII-based text, QR code, or other code), an appointment scheduling link, etc.). In some embodiments, the client nodes may provide a virtual reality (VR) environment for a user. The VR environment may be immersive VR environment or a cyberspace environment. In some embodiments, the environment may be a room in which the subject is located, and VR environment enables a user to see the images of a subject in addition to the room. In some embodiments, the VR environment may enable real time audio and/or visual connectivity between a user and a subject. Additionally or alternatively, health data associated with the subject collected by one or more sensors is presented to a user along with the audio and/or visual connectivity.

In at least some examples, the server platform 320 may be one or more computing devices or systems, storage devices, and other components that include, or facilitate the operation of, various execution modules depicted in FIG. 3. These modules may include, for example, access code generation engine 324, data packet delivery engine 326, health data process module 328, data access modules 342, and data storage 350. Each of these modules is described in greater detail below.

The access code generation engine 324 may generate and update access code. The access code, in some embodiments, may comprise, without limitation, ASCII-based text, QR code, or other code. In some embodiments, the access code may grant access for a user to a building, an event, or an area of a building. The access code may be presented and authenticated by a reading machine, such as a code scanner. The access code generation engine 324 generates the access code based, at least in part, on user-filed information, vitals of the user, past travel history of a user, and virus contact history of a user, etc. In some embodiments, the access code may indicate a low-risk, medium-risk, or high-risk of a user and grant access level accordingly. In some embodiments, the access code generation engine 324 may update the access code based, at least in part on, updated user-filed information, vitals of the user, past travel history of a user, virus contact history of a user, etc.

The data packet delivery engine 326 may deliver an access code to a client node. In some embodiments, the data packet delivery engine 326 may deliver an updated access code to a client node. The health data process module 328 may process health data for a user, and transmit the result to access code generation engine 324. The health data process module 328 may retrieve user historical health data from data storage 350, and process the health data accordingly. In some embodiments, the health data process module 328 may receive health data from a client node (for example, from sensors associated with a client node), and process the health data. In some embodiments, the health data process module 328 may process user's historical health data and data collected from client node in tandem. For example, the history health data associated with User A may show that User A has chronic cardio disease, and the sensor-collected health data shows that User A is currently experiencing high fever, and short of breath; the health data process module 328 may process these data in tandem and return the result to access code generation engine 324. In some embodiments, the health data process module 328 may utilize a machine-learning algorithm to process the health data. For example, if a number of users who have similar health data as a subject user, and eventually these users were diagnosed with a certain virus, this set of data may be fed into a machine-learning algorithm. By training, the machine-learning algorithm may be able to make predictions for an incoming health data set and provide the prediction to the access code generation module.

Data access modules 342 may facilitate access to data storage 350 of the server platform 320 by any of the remaining modules 324, 326, and 328 of the server platform 320. In one example, one or more of the data access modules 342 may be database access modules, or maybe any kind of data access module capable of storing data to, and/or retrieving data from, the data storage 350 according to the needs of the particular module 324, 326, and 328 employing the data access modules 342 to access the data storage 350. Examples of the data storage 350 include, but are not limited to, one or more data storage components, such as magnetic disk drives, optical disk drives, solid state disk (SSD) drives, and other forms of nonvolatile and volatile memory components.

As shown in FIG. 3, admin interface 330 may be coupled directly to the server platform 320, thus circumventing the network 314. For example, the admin interface 330 may be co-located with the server platform 320, coupled thereto via a local network interface. In another example, the admin interface 330 may communicate with the server platform 320 via a private or public network system, such as the network 314.

Computer Systems

Figure 4:
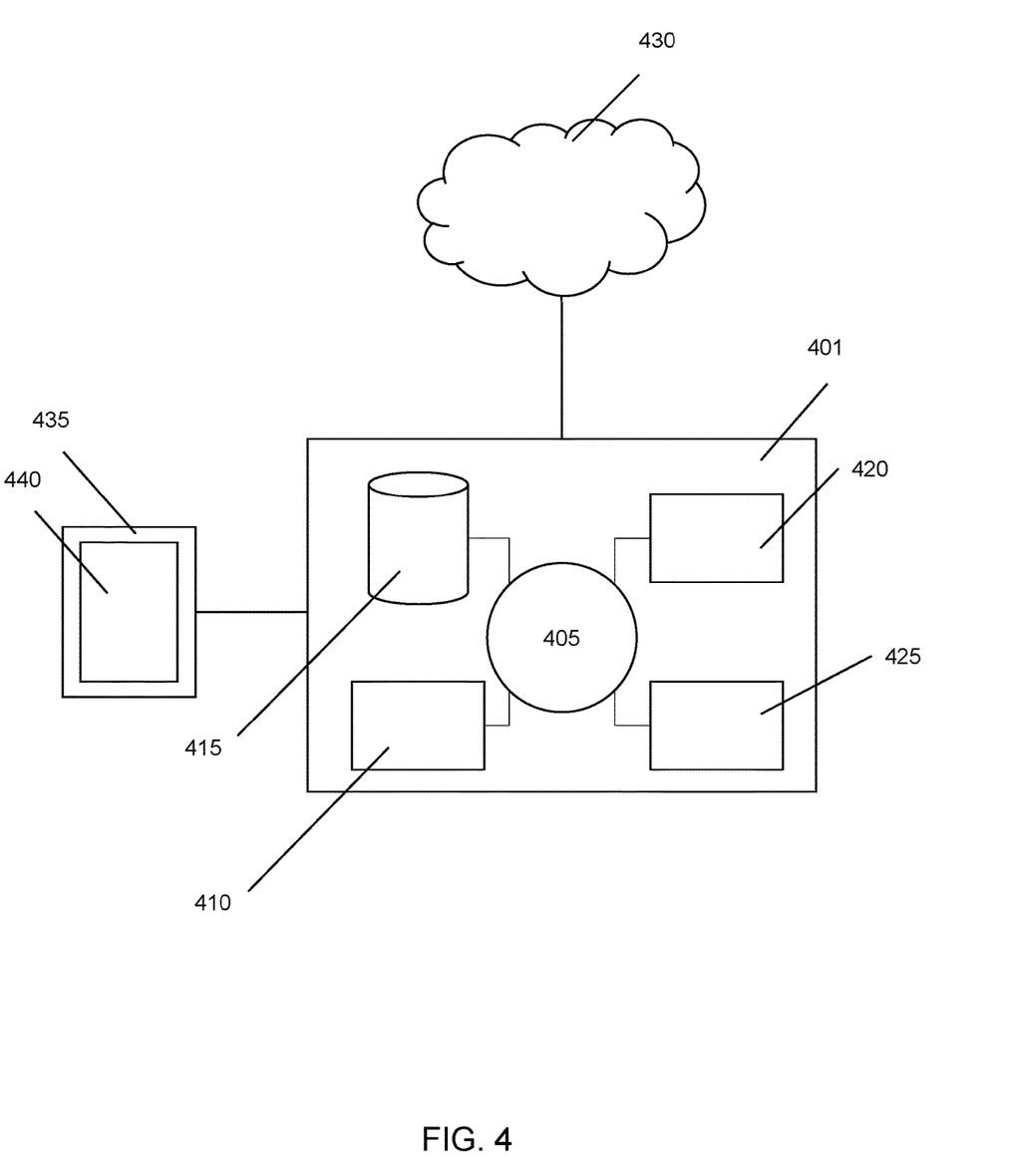
FIG. 4 illustrates a computer system that is programmed or otherwise configured to implement methods provided herein, according to some embodiments.

The present disclosure provides computer systems that are programmed to implement methods of the disclosure. FIG. 4 shows a computer system 401 that is programmed or otherwise configured to facilitate the exchange and/or delivery of data packets for communications between multiple client nodes and platforms. The computer system 401 can regulate various aspects of data generation and coordination of the present disclosure. The computer system 401 can be an electronic device of a user or a computer system that is remotely located with respect to the electronic device. The electronic device can be a mobile electronic device.

The computer system 401 includes a central processing unit (CPU, also "processor" and "computer processor"

herein) 405, which can be a single core or multi core processor, or a plurality of processors for parallel processing. The computer system 401 also includes memory or memory location 410 (e.g., random-access memory, read-only memory, flash memory), electronic storage unit 415 (e.g., hard disk), communication interface 420 (e.g., network adapter) for communicating with one or more other systems, and peripheral devices 425, such as cache, other memory, data storage and/or electronic display adapters. The memory 410, storage unit 415, interface 420 and peripheral devices 425 are in communication with the CPU 405 through a communication bus (solid lines), such as a motherboard. The storage unit 415 can be a data storage unit (or data repository) for storing data. The computer system 401 can be operatively coupled to a computer network ("network") 430 with the aid of the communication interface 420. The network 430 can be the Internet, an internet and/or extranet, or an intranet and/or extranet that is in communication with the Internet. The network 430 in some cases is a telecommunication and/or data network. The network 430 can include one or more computer servers, which can enable distributed computing, such as cloud computing. The network 430, in some cases with the aid of the computer system 401, can implement a peer-to-peer network, which may enable devices coupled to the computer system 401 to behave as a client or a server.

The CPU 405 can execute a sequence of machine-readable instructions, which can be embodied in a program or software. The instructions may be stored in a memory location, such as the memory 410. The instructions can be directed to the CPU 405, which can subsequently program or otherwise configure the CPU 405 to implement methods of the present disclosure. Examples of operations performed by the CPU 405 can include fetch, decode, execute, and writeback.

The CPU 405 can be part of a circuit, such as an integrated circuit. One or more other components of the system 401 can be included in the circuit. In some cases, the circuit is an application specific integrated circuit (ASIC).

The storage unit 415 can store files, such as drivers, libraries and saved programs. The storage unit 415 can store user data, e.g., user preferences and user programs. The computer system 401 in some cases can include one or more additional data storage units that are external to the computer system 401, such as located on a remote server that is in communication with the computer system 401 through an intranet or the Internet.

The computer system 401 can communicate with one or more remote computer systems through the network 430. For instance, the computer system 401 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iphone, Android-enabled device, Blackberry®), or personal digital assistants. The user can access the computer system 401 via the network 430.

Methods as described herein can be implemented by way of machine (e.g., computer processor) executable code stored on an electronic storage location of the computer system 1101, such as, for example, on the memory 410 or electronic storage unit 415. The machine executable or machine readable code can be provided in the form of software. During use, the code can be executed by the processor 405. In some cases, the code can be retrieved from the storage unit 415 and stored on the memory 410 for ready access by the processor 1105. In some situations, the electronic storage unit 415 can be precluded, and machine-executable instructions are stored on memory 410.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1101, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 401 can include or be in communication with an electronic display 1135 that comprises a user interface (UI) 1140 for providing, for example, access code. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 405. The algorithm can, for example, a machine-learning algorithm.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some examples, a service can be software that resides in memory of a client device and/or one or more servers of a content management system and perform one or more functions when a processor executes the software associated with the service. In some examples, a service is a program, or a collection of programs that carry out a specific function. In some examples, a service can be considered a server. The memory can be a non-transitory or transitory computer-readable medium.

In some examples the computer-readable storage devices, mediums, and memories can include a cable or wireless signal containing a bit stream and the like. However, when mentioned, transitory computer-readable storage media are media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Having now fully set forth examples and certain modifications of the concept underlying the present invention, various other examples as well as certain variations and modifications of the examples shown and described herein will obviously occur to those skilled in the art upon becoming familiar with said underlying concept.

What is claimed is:

1. A computer-implemented method for providing a message that is graphically presented in a user interface, comprising:

retrieving, by one or more computer processors over a network from a remote database, health history data associated with a user, wherein the health history data comprises one or more pre-existing health conditions of the user;

receiving, by the one or more computer processors, current health data associated with the user representing a current health condition of the user, wherein the current health data is received from a sensor or an input by the user, or both;

processing, by a health data process module of the one or more computer processors, the health history data of the user and the current health data of the user in tandem;

receiving, at the health data process module of the one or more computer processors, health data of a selection of additional users, wherein the health data comprises health history data associated with the selection of additional users that is similar to the health history data of the user, current health data associated with the selection of additional users that is similar to the current health data of the user, and diagnostic data of the selection of additional users comprising diagnosis of a health event;

determining, utilizing the health data process module of the one or more computer processors, a risk of the user experiencing the health event based at least in part on: (i) the health history data and the current health data of the user processed in tandem, and (ii) the health data of the selection of additional users;

dynamically generating, by the one or more computer processors, a risk-level for the user based on the determined risk of the user experiencing the health event;

updating, by the one or more computer processors, the risk-level for the user based at least in part on receiving: (i) updated health history data of the user, (ii) updated current health data of the user, or (iii) updated health data of a selection of additional users, or any combination thereof;

upon identifying the dynamically-generated risk-level is a first risk level, generating, by the one or more computer processors, the message comprising the first risk-level and an access code for accessing a healthcare facility, or upon identifying the dynamically-generated risk-level is a second risk level, a message comprising the second risk-level and a virtual appointment; and delivering, by the one or more computer processors, the message to the user.

2. The method of claim 1, wherein the access code grants access to a physical area for the user.

3. The method of claim 2, wherein the physical area comprises a code reading machine which scans the access code to determine whether to allow access to the physical area.

4. The method of claim 1, wherein the access code comprises a bar code.

5. The method of claim 1, wherein the access code comprises a QR code.

6. The method of claim 1, further comprising:
generating, by the one or more computer processors, an updated message comprising an updated access code based, at least in part, on the updated risk-level.

7. The method of claim 6, further comprising: delivering, by the one or more computer processors, the updated access code to the user.

8. The method of claim 1, wherein the risk-level further comprises the user's risk of contracting an infectious disease in the future, or the user's risk of current infection, or both.

9. The method of claim 1, wherein dynamically generating the risk-level comprises performing continuous real-time dynamic re-matching of the user to one or more stratified risk-level groups.

10. The method of claim 1, further comprising generating, by the one or more computer processors, customized user instructions to the user based on the dynamically-generated risk-level.

11. The method of claim 10, wherein the customized user instructions comprise instructions for facilitating health treatment of the user, instructions to seek a healthcare provider, instructions to enter or not enter an area, or any combination thereof.

12. A system for providing a message that is graphically presented in a user experience, comprising:
one or more remote servers comprising at least one electronic data repository; and
one or more computer processors operatively coupled to said one or more remote servers, wherein the one or more computer processors are individually or collectively programmed to:
retrieve over a network from the one or more remote servers health history data associated with a user, wherein the health history data comprises one or more pre-existing health conditions of the user,
receive current health data associated with the user representing a current health condition of the user from a sensor or an input by the user, or both,
analyze the health history data of the user and the current health data of the user in tandem,
receive health data of a selection of additional users, wherein the health data comprises health history data associated with the selection of additional users that is similar to the health history data of the user, current health data associated with the selection of additional users that is similar to the current health data of the user, and diagnostic data of the selection of additional users comprising diagnosis of a health event,
determine a risk of the user experiencing a health event based at least in part on: (i) the health history data and the current health data of the user processed in tandem, and (ii) the health data of the selection of additional users, and
dynamically generate a risk-level for the user based on the determined risk of the user experiencing the health event and the current health data,
update the risk-level for the user based at least in part on receiving: (i) updated health history data of the user, (ii) updated current health data of the user, or (iii) updated health data of a selection of additional users, or any combination thereof,
generate a message comprising an access code based, at least in part, on the dynamically-generated risk-level for the user to access a healthcare facility upon identifying the dynamically-generated risk-level is a first risk level, or automatically trigger a virtual appointment upon identifying the dynamically-generated risk-level is a second risk level, and
deliver the message comprising the access code to the user.

13. The system of claim 12, wherein the access code grants access to a physical area for the user.

14. The system of claim 13, wherein the physical area comprises a code reading machine which scans the access code to determine whether to allow access to the physical area.

15. The system of claim 12, wherein the access code comprises a bar code.

16. The system of claim 12, wherein the access code comprises a QR code.

17. The system of claim 12, wherein the one or more computer processors are individually or collectively further programmed to:

generate an updated message comprising an updated access code based, at least in part, on the updated risk-level.

18. The system of claim 17, further comprising: delivering, by the one or more computer processors, the updated access code to the user.

19. The system of claim 12, wherein the one or more computer processors are further programmed to generate customized user instructions to the user based on the dynamically-generated risk-level.

* * * * *